(12) United States Patent
Piegert et al.

(10) Patent No.: US 12,217,176 B2
(45) Date of Patent: Feb. 4, 2025

(54) AUTOMATIC IDENTIFICATION AND CLASSIFICATION OF ADVERSARIAL ATTACKS

(71) Applicant: Conti Temic microelectronic GmbH, Nuremberg (DE)

(72) Inventors: Eric Piegert, Kriftel (DE); Michelle Karg, Lindau (DE); Christian Scharfenberger, Lindau (DE)

(73) Assignee: Conti Temic microelectronic GmbH, Nuremberg (DE)

(*) Notice: Subject to any disclaimer, the term of this patent is extended or adjusted under 35 U.S.C. 154(b) by 515 days.

(21) Appl. No.: 17/593,558

(22) PCT Filed: Mar. 17, 2020

(86) PCT No.: PCT/DE2020/200018
§ 371 (c)(1),
(2) Date: Sep. 21, 2021

(87) PCT Pub. No.: WO2020/192849
PCT Pub. Date: Oct. 1, 2020

(65) Prior Publication Data
US 2022/0174089 A1 Jun. 2, 2022

(30) Foreign Application Priority Data
Mar. 28, 2019 (DE) .................... 10 2019 204 318.6

(51) Int. Cl.
*G06V 10/764* (2022.01)
*G06N 3/045* (2023.01)
(Continued)

(52) U.S. Cl.
CPC ............. *G06N 3/08* (2013.01); *G06N 3/045* (2023.01); *G06V 10/454* (2022.01);
(Continued)

(58) Field of Classification Search
CPC ........ G06F 18/24; G06N 20/00; G06N 3/045; G06N 3/08; G06V 10/454; G06V 10/764; G06V 10/82; G06V 20/56; H04L 63/1441
See application file for complete search history.

(56) References Cited

U.S. PATENT DOCUMENTS 10,800,434 B1 * 10/2020 Beecham ............... G06V 20/35
2011/0135203 A1 6/2011 Iwamoto et al.
(Continued)

FOREIGN PATENT DOCUMENTS

CN 102184537 A 9/2011
CN 105261013 A 1/2016
(Continued)

OTHER PUBLICATIONS

Sameer, V.U., Naskar, R., Musthyala, N., Kokkalla, K. Deep Learning Based Counter-Forensic Image Classification for Camera Model Identification. Digital Forensics and Watermarking. IWDW 2017. Lecture Notes in Computer Science( ), vol. 10431. Springer (2017) (Year: 2017).*

(Continued)

*Primary Examiner* — Theodore C Parsons

(57) ABSTRACT

A method for identifying adversarial attacks on an image based detection system for automated driving includes providing a reference signal and a potentially manipulated signal. The method also includes calculating a plurality of metrics which quantify differences between the signals in different ways. The method further includes creating a multi-dimensional feature space based on the calculated metrics and classifying the type of attack based on the calculated metrics. The class of the adversarial attack may then be output.

18 Claims, 4 Drawing Sheets

(51) Int. Cl.
    *G06N 3/08*     (2023.01)
    *G06V 10/44*     (2022.01)
    *G06V 10/82*     (2022.01)
    *G06V 20/56*     (2022.01)
    *H04L 9/40*     (2022.01)

(52) U.S. Cl.
    CPC ............ *G06V 10/764* (2022.01); *G06V 10/82* (2022.01); *G06V 20/56* (2022.01); *H04L 63/1441* (2013.01)

(56) References Cited

U.S. PATENT DOCUMENTS

| | | |
|---|---|---|
| 2014/0270531 A1 | 9/2014 | Nakagata |
| 2014/0320644 A1* | 10/2014 | Hegemann ................ G06T 7/35 348/140 |
| 2016/0112624 A1 | 4/2016 | Wolfgang |
| 2018/0018535 A1 | 1/2018 | Yurong |
| 2018/0165508 A1 | 6/2018 | Othman et al. |
| 2019/0080089 A1 | 3/2019 | Chen |
| 2019/0238568 A1* | 8/2019 | Goswami ............. G06F 21/566 |
| 2019/0251395 A1* | 8/2019 | Zhang ...................... G06N 7/01 |
| 2019/0318099 A1 | 10/2019 | Carvalho et al. |
| 2021/0056404 A1* | 2/2021 | Goswami ................ G06F 18/22 |
| 2021/0150036 A1 | 5/2021 | Kaneko et al. |
| 2022/0126864 A1* | 4/2022 | Moustafa ......... G08G 1/096775 |
| 2022/0174089 A1* | 6/2022 | Piegert .................. G06V 10/82 |

FOREIGN PATENT DOCUMENTS

| | | |
|---|---|---|
| CN | 108292369 A | 7/2018 |
| CN | 108335289 A | 7/2018 |
| CN | 108491837 A | 9/2018 |
| DE | 102013209940 A1 | 12/2014 |
| EP | 3641214 A1 | 4/2020 |
| JP | 2014182440 A | 9/2014 |
| JP | 2016157455 A | 9/2016 |
| JP | 2018165926 A | 10/2018 |
| JP | 2019036865 A | 3/2019 |
| WO | 2010087124 A1 | 8/2010 |
| WO | WO-2012045317 A1 * | 4/2012 ......... G06K 9/00711 |
| WO | 2014042514 A2 | 3/2014 |
| WO | 2018230366 A1 | 12/2018 |

OTHER PUBLICATIONS

Japanese Office Action dated Aug. 5, 2022 for the counterpart JJapanese Patent Application No. 2021-545871.
German Search Report dated Oct. 31, 2019 for the counterpart German Patent Application No. 10 2019 204 318.6.
International Search Report and the Written Opinion of the International Searching Authority mailed on Aug. 21, 2020 for the counterpart PCT Application No. PCT/DE2020/2000018.
N. Carlini, D. Wagner, "Audio Adversarial Examples: Targeted Attacks on Speech-to-Text", Mar. 30, 2018, University of California, Berkeley.
N. Akhtar, A. Mian, "Threat of Adversarial Attacks on Deep Learning in Computer Vision, A Survey", IEEE Access, vol. 6 2018, accepted Feb. 8, 2018, date of publication Feb. 19, 2018.
R Venkatesan "Robust Image Hashing" Cryptography Group, Microsoft Research, 1 Microsoft Way, Redmond, WA 98052-6399 2 Univ. of Illinois, Beckman Inst. & ECE Dep.
Jacob Goldberger et al., "An Efficient Image Similarity Measure based on Approximations of KL-Divergence Between Two Gaussian Mixtures", Cute Systems, Tel Aviv, Israel and The Engineering Department, Tel Aviv University, Israel.
Mahmood Sharif et al., "On the Suitability of Lp-norms for Creating and Preventing Adversarial Examples", † University of North Carolina at Chapel Hill.
Alain Hore et al., "Image quality metrics: PSNR vs. SSIM", Département d'informatique, Faculté des sciences, Université de Sherbrooke, Quebec, Canada.
Christian Szegedy et al., "Intriguing properties of neural networks", Google Inc., New York University, University of Montreal, and Facebook Inc.
Uyeong Jang et al., "Objective Metrics and Gradient Descent Algorithms for Adversarial Examples in Machine Learning", University of Wisconsin and Google.
Chinese First Office Action dated for the counterpart Chinese Patent Application No. 202080016237.2, dated Sep. 19, 2023, and translation of same.

\* cited by examiner

AUTOMATIC IDENTIFICATION AND CLASSIFICATION OF ADVERSARIAL ATTACKS

TECHNICAL FIELD

The technical field relates to a method and a system for identifying adversarial attacks on an automated detection system, in particular an image-based detection system such as, for example, an object detection system of an intelligent camera sensor for assisted or automated driving.

Artificial intelligence, artificial neural networks, machine learning and deep learning are becoming increasingly widespread in the context of assisted and automated driving. Machine vision (computer vision) is the most frequent area of application.

Szegedy et al. show in *Intriguing properties of neural networks*, arXiv:1312.6199v4 [cs.CV], 19 Feb. 2014, accessed at https://arxiv.org/abs/1312.6199 on 21 Mar. 2019, that so-called "adversarial examples" are surprisingly wrongly classified by a trained deep neural network for identifying images, although the alteration with respect to a correctly identified image example appears irrelevant to the human observer. This is due to the way that deep networks operate, which can be abused for manipulation in the form of "adversarial attacks".

The prior art comprises the production of adversarial attacks based on various processes and various methods for defending against adversarial attacks. There is currently a plurality of possible attacks which make, in part, very similar, but also quite different global or local changes to an image. Furthermore, in order to assess the quality of changes by adversarial attacks, only a few metrics which are already used to generate attacks currently exist. It has been shown that the existing metrics are not sufficient to completely describe the changes in the image caused by adversarial attacks, and to assess the quality of an attack.

The following publications are devoted to this subject:

Uyeong Jang, Xi Wu, and Somesh Jha. Objective metrics and gradient descent algorithms for adversarial examples in machine learning. In Proceedings of the 33$^{rd}$ Annual Computer Security Applications Conference, Orlando, FL, USA, Dec. 4-8, 2017, pages 262-277, 2017, doi:10.1145/3134600.3134635.

Mahmood Sharif, Lujo Bauer, and Michael K. Reiter. On the suitability of $L_p$-norms for creating and preventing adversarial examples. CoRR, abs/1802.09653, 2018.

Naveed Akhtar and Ajmal Mian. Threat of adversarial attacks on deep learning in computer vision: A survey. IEEE Access, 6:14410-14430, 2018, doi:10.1109/ACCESS.2018.2807385.

BRIEF SUMMARY

A fundamental aspect for detailed identification consists of finding out with which adversarial attack a network has been attacked, i.e., of classifying the adversarial attack. Changes which a potentially manipulated image has experienced with respect to a reference image form the basis of the classification. A metric which is calculated on the basis of the two images and which quantifies the calculation serves as a measure of the changes in the image. A class of adversarial attacks ("attack class") can include an individual type of adversarial attack or a group of adversarial attacks which manipulate images with a similar behavior. Further classes can be provided for "no change" of the images, "changes in the image, the cause of which can be explained in other ways" (e.g., due to disturbances during the image acquisition) and "unknown potential attacks".

An aspect of the disclosure includes using multiple metrics jointly in order to describe the changes which an image has experienced.

A further aspect includes distinguishing and identifying attacks solely on the basis of their changes to the image. This makes it possible for the network to identify adversarial attacks within the running time of the detection. Furthermore, defense measures (defenses, countermeasures) which have been developed especially for a particular attack class can be advantageously deployed, since the attack class is identified.

An early identification and recognition of an adversarial attack consequently makes it possible to develop and use targeted defense mechanisms.

If sufficient features are developed which can describe the changes in the image, the various classes of changes are better understood and better defense methods can be developed in future.

A further aspect of the disclosure is that the multiplicity of metrics used produce a high-dimensional space in which attacks can be separated and consequently existing or correspondingly trained classifiers can identify the attacks.

A starting point is the realization that known methods have the following disadvantages:
- No identification of the attack class;
- No early identification that an attack has taken place;
- No application and development of defenses against defined attack classes.

The disclosure includes the following elements:
1) The identification of attack classes based on machine learning, i.e., features are automatically identified and various attack classes are detected with the aid of a learning method based on these features; and
2) The use of the previously indicated identification of attack classes within the framework of an automated detection system for (online) identification of attacks. For example, decisions can be made for a targeted online defense of a particular attack. In this case, online means within the framework of (before or during) the automated detection.

The method and system described herein can be utilized for any attacks on any input signals, in particular image, video, or audio signals, if neural networks are used for detection or classification on the basis of the input signals. Thus, the method can be deployed for medical technology, for voice processing, for internet searches or for vehicle systems.

A method according to one exemplary embodiments for identifying and classifying adversarial attacks on an automated detection system (having a first neural network for classifying the image/video/audio signals) includes:

a) providing a reference image/video/audio signal, for example an original image, and a potentially manipulated image/video/audio signal;

b) calculating a set of n metrics which quantify differences between the reference signal and the potentially manipulated signal in different ways, with n being a natural number greater than one;

c) creating an n-dimensional feature space based on the calculated metrics;

d) classifying the type of adversarial attack on the basis of the calculated metrics in the n-dimensional feature space;

e) outputting the class of the adversarial attack.

The automated detection system includes a (first) neural network for classifying the image/video/audio signals. This can be, for example, an image-based object classification system or an audio-based voice recognition system. The automated detection system can be attacked by adversarial attacks. To this end, the signals which find their way into the neural network have to be manipulated. Differences are quantified by comparing a reference signal and a potentially manipulated signal. The designation (step c) "creating an n-dimensional feature space based on the calculated metrics" is equivalent to the following formulation: "Forming an n-dimensional feature vector which comprises the n calculated metrics". The quantified differences (or the n-dimensional feature vector) are (or is) classified by a second neural network into classes of predefined adversarial attacks trained by the second network.

In an advantageous further development, a specific counter-measure against a class of adversarial attacks identified as critical is introduced in a subsequent method step f). Such a counter-measure can, e.g., be a use of a/another CNN-based detector which is robust against this type of attack.

The automated detection system may include a camera-based sensor system of a vehicle, wherein the potentially manipulated signals are image or video signals which have been acquired by at least one camera of the camera-based sensor system. Optionally, the reference signals can have also been acquired by the at least one camera. However, it is also possible to use reference signals which have been acquired by another camera.

The method may be performed in order to identify an adversarial attack during a signal data transfer from the vehicle to an online database.

Alternatively, the detection system may include a multicamera system in a vehicle. According to this embodiment, the potentially manipulated image or video signal and the reference image or video signal are overlapping or temporally offset acquisitions of the same scene by various individual cameras of the multicamera system.

The metrics may be calculated on the entire potentially manipulated image. If the reference image has been acquired by the same camera, it is compared with the entire reference image. If the reference image depicts a larger region, it is compared with the image detail which corresponds to the content of the potentially manipulated image.

Alternatively, the metrics are calculated on an image detail of the entire potentially manipulated image. This may be necessary if the reference image only depicts a partial region of the content of the potentially manipulated image.

The metrics may be calculated on a series of images or from a series of image details.

The n metrics advantageously contain multiple metrics which are selected from the group of: SSIM; $L_1$-norm, $L_2$-norm, KL divergence, MSE (Mean Squared Error), MAE (Mean Average Error), PSNR, $L_\infty$-norm (L infinity-norm), $L_0$-norm, Edge metrics, hash metrics and Fourier transform metrics.

In addition to the publications already indicated, details regarding these metrics can be found in:
Hore, A. and Ziou, D., 2010, August. Image quality metrics: PSNR vs. SSIM. In 2010 20th International Conference on Pattern Recognition (pp. 2366-2369). IEEE. Goldberger, J., Gordon, S. and Greenspan, H., 2003, October. An efficient image similarity measure based on approximations of KL-divergence between two Gaussian mixtures. In null (p. 487). IEEE.
Uyeong Jang, Xi Wu, and Somesh Jha. Objective metrics and gradient descent algorithms for adversarial examples in machine learning. In Proceedings of the 33rd Annual Computer Security Applications Conference, Orlando, FL, USA, Dec. 4-8, 2017, pages 262-277, 2017.
Ramarathnam Venkatesan, S-M Koon, Mariusz H Jakubowski, and Pierre Moulin. Robust image hashing. In Image Processing, 2000. Proceedings. 2000 International Conference on, volume 3, pages 664-666. IEEE, 2000.

According to a one embodiment of the method, subsets are created from the n metrics in order to extract the most relevant m metrics, with m being a natural number less than n and, in step d), the classification is effected on the basis of the calculated metrics in the m-dimensional feature space.

Furthermore, the creation of the subsets can be implemented based on machine learning. In this case, the features are automatically extracted. The metrics are automatically learned with the aid of representation learning.

A further aspect of the disclosure includes a system for identifying adversarial attacks on an automated detection system, including an input interface, an identification unit and an output interface. The system for identifying the adversarial attacks can be integrated into the automated detection system; it can, however, also be upstream of the latter.

The input interface is configured to receive a reference image/video/audio signal and a potentially manipulated image/video/audio signal and to provide the latter to the identification unit.

The identification unit carries out the classification of the attacks and, to this end, typically includes a second neural network. The identification unit is configured:
  to calculate a set of n metrics which quantify differences between the reference image/video/audio signal and the potentially manipulated image/video/audio signal in different ways,
  to create a n-dimensional feature space based on the calculated metrics, and
  to classify the type of adversarial attack on the basis of the calculated metrics in the n-dimensional feature space.

The output interface is configured to output the class of the adversarial attack established by the identification unit. The established class can be used by a downstream defense unit in order to introduce targeted defense measures against the attack class before the potentially manipulated image/video/audio signal is delivered to the automated detection system. Alternatively, the class established by the identification unit can be transmitted directly via the output interface to the automated detection system.

The system for identifying adversarial attacks can in particular comprise a microcontroller or processor, a central processing unit (CPU), a graphic processing unit (GPU), a digital signal processor (DSP), an ASIC (Application Specific Integrated Circuit), a FPGA (Field Programmable Gate Array) and more of the same as well as software for performing the corresponding method steps.

The method and/or system described herein can consequently be implemented in digital electronic circuits, computer hardware, firmware or software.

Further aspects and embodiments for identifying attack classes on image signals based on machine learning are explained below:

Initially, a set of metrics which quantify the difference between images is calculated. These metrics are calculated on a pair of images consisting of an original and a potentially changed image. In this case, the calculation can refer to the entire image or relevant image details. The metric can, thus, be calculated either on the entire image, on an image detail, on a series of images or on a series of image details.

Further subsets can be created from these metrics in order to extract the most relevant metrics. This can be implemented manually or, in turn, based on machine learning, in this case by means of automatic feature extraction. If such metrics are observed in isolation, this frequently creates a huge spread and overlapping of various attacks.

This realization is consistent for all of the metrics evaluated in the present case and suggests a combination of various metrics, in order to be able to better separate attacks from one another. One metric alone is not sufficient to be able to describe the change to an image satisfactorily or to be able to allocate the change to an attack class. Consequently, a satisfactory set of metrics is required for the identification of attack classes. These metrics can either be automatically learned with machine learning or manually defined.

The combination of metrics makes it possible to separate attacks in the corresponding spaces.

Various two-dimensional combinations lead to various separations of the attacks in the space. The realization strengthens the combination of multiple metrics in higher-dimensional spaces.

A method for the identification can be summarized as follows:
A) Training method (training phase):
  Calculation of metrics which quantify the difference between two images. These metrics can be manually defined (SSIM; $L_1$-norm, $L_2$-norm, KL divergence, MSE, MAE, PSNR, $L_\infty$-norm, $L_0$-norm, Edge metrics, hash metrics and Fourier transform metrics, etc.) or can be automatically learned based on machine learning.
  Creating a multi-dimensional feature space based on the metrics
  Optionally: Selecting the most relevant features by automatic feature extraction or manually
  Learning a classifier based on the metrics
B) Inference regarding the running time (test phase):
  Calculating the metrics on a pair of images
  Transformation in the feature space
  Applying the learned classifier from the training phase
C) Extension:
  The feature extraction, feature reduction and classification can be summarized and jointly learned in one step with the aid of deep learning and representation learning.

Further aspects and embodiments for using the identification of attack classes previously described within the framework of an automated image-based detection system for the online identification of attacks are described below.

An application of the attack detection and classification during the transfer of images of safety-critical detection systems is advantageous since this makes it possible to identify attacks on the transfer or during the transfer.

If images are transferred, for example into a cloud, on the internet or via WLAN, the images pass through various exchange points, where there is a possibility of attacks. Reference images from previous exchange points are available in the case of this application.

Further possible applications are transfers of images between mobile devices and online databases or between two online databases.

Transfers of image data between a vehicle and an online database, between two processors in a vehicle or between two processors of embedded systems are further advantageous applications.

The identification method can be integrated into safety-critical identification systems as follows:

a) The input data consist of images which may be subjected to an adversarial attack;
b) In addition to the input images, reference images exist which are not exposed to the attack. The reference images can be details from another camera sensor, temporally offset images, images from previous or following system components, or reference images of the scene, e.g., the road traffic scene, from the Internet;
c) The attack identification described above recognizes the attack or the attack class;
d) Based on the attack or the attack class, the decision-making system makes decisions. These include:
  D1) No attack detected or a non-critical attack detected: the system continues working in normal mode;
  D2) Detection of another problem which can lead to pixel disturbances on the image, e.g., overexposure, masking, dirt;
  D3) Detection of a critical attack class and, consequently, of an attack: defense against the attack by a selected defense strategy based on the attack/attack class.

The identification system for attack classes is necessary in order to develop defense strategies in a manner which is geared to various attack classes.

The described method and/or system makes it possible to identify "adversarial attacks" on the basis of their changes to the image and to determine the attack class. This makes it possible to select a defense method based on the attack class and the use of a decision-making system in order to decide what procedure is to be adopted for the attack (critical vs. uncritical attack).

A further application of the method is identifying changes to the image by processing steps in the image processing pipeline of identification algorithms.

Examples of an integration into the camera-based sensor technology of a vehicle are:
A) A transfer of data acquired by a vehicle to an online database:
In future, an original image captured by a vehicle camera can be transferred wirelessly (vehicle-2-X communication) to an online database (e.g., cloud). A cloud service can carry out further processing (automated detection) of the transferred image. This can be a possible point of attack for an attack on the data transfer, e.g., via the internet. Attackers could obtain access to transferred image data via interfaces required for cloud computing before the automated detection by the cloud service. Reference images are images from previous processing steps, e.g., a previous exchange point in the internet or the original image acquired by the camera from the vehicle, which is available in the vehicle. The assault by an attack and the attack class can be recognized on the basis of an image and the reference image. The check for an attack can take place within a defined interval, e.g., every 100 image transfers.
B) A multicamera system in an autonomous vehicle:
Here, the software of one or more camera sensors can be affected by an attack.
Reference images can be overlapping or temporally offset acquisitions of the same scene by various cameras. If an attack is suspected, the attack class can be determined with the aid of the attack identification and an adequate defense mechanism can be selected.

BRIEF DESCRIPTION OF THE DRAWINGS

Exemplary embodiments and figures are described in greater detail below, wherein.

DETAILED DESCRIPTION

Figure 1:
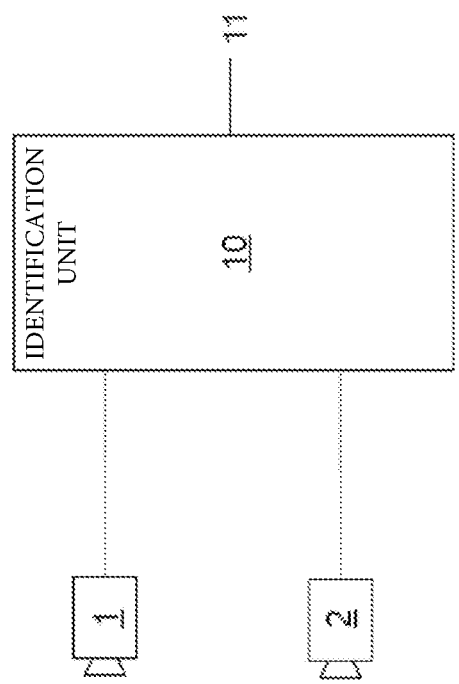
FIG. 1: shows a camera system of a vehicle having two camera sensors and an identification unit.

FIG. 1 schematically shows a camera system of a vehicle having two camera sensors. A first camera sensor 1 captures a first image which serves as a reference image, and provides the first image to the identification unit 10. A second camera sensor 2 captures a second image which serves as the potentially manipulated image in this example, and provides the second image to the identification unit 10. The identification unit processes the first and the second image and classifies, on the basis of the differences, whether an adversarial attack exists and, if yes, which attack class can be allocated to the differences.

The class of adversarial attack is output via an interface 11. In addition to different actual adversarial attack classes, classes can also be predefined which do not correspond to any adversarial attack.

Figure 2:
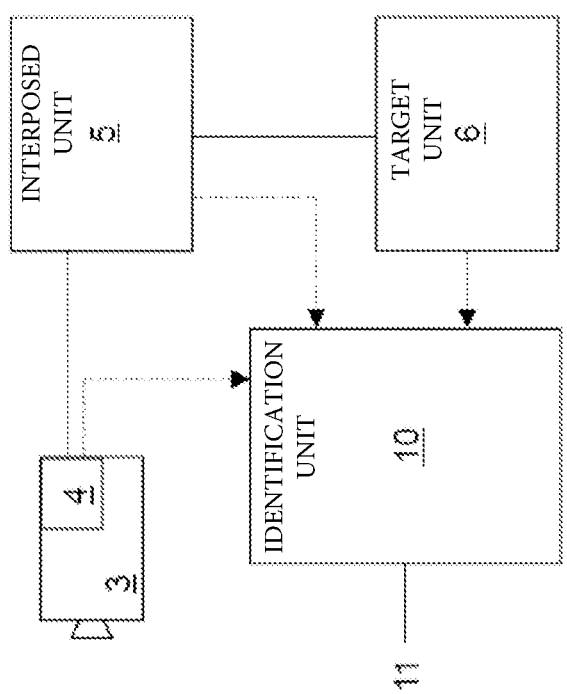
FIG. 2: shows a camera system and a data transfer of image data.

FIG. 2 shows a camera system and a data transfer of image data. The camera system shown comprises a camera 3 having an integrated data interface 4, by means of which image data can be transmitted to an interposed unit 5. Optionally, the image data can be transferred as an original image directly to the identification unit 10. The image data are further transferred by the interposed unit 5 to a target unit 6 and, optionally, in addition to the identification unit 10. The image data are transferred by the target unit 6 to the identification unit 10 so that the image data can be checked for a manipulation. The target unit 6 can, for example, be an online database, cloud or a backbone server. This can be a possible point of attack for an attack on the data transfer which is effected, e.g., via the internet. The interposed unit 5 can, for example, be a previous exchange point in the internet, the image data of which can be used as the reference image. The image acquired in the vehicle can be transferred by the integrated data interface 4 as a reference image directly to the identification unit 10. The assault by an attack and the attack class can be recognized on the basis of the image and an associated reference image. The check for an attack can take place within a defined interval, e.g., every 100 image transfers.

Figure 3:
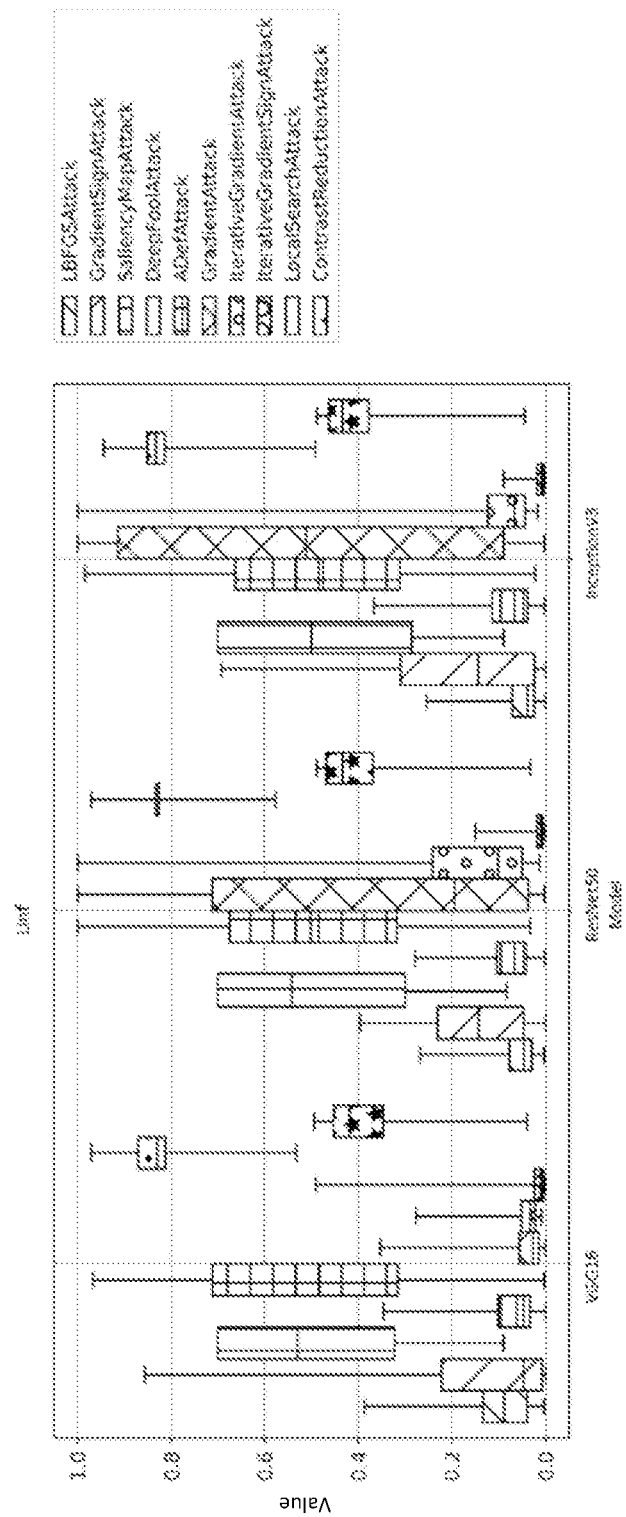
FIG. 3: shows an illustration of the spread of the values of a metric for various attacks and various network architectures.

FIG. 3 illustrates the spread of the values of a metric established from examples for various attacks and various network architectures.

A metric is calculated on the basis of a pair of images consisting of a reference image or original image and a potentially changed image. In this case, the calculation can refer to the entire image or relevant image details.

If such metrics are observed in isolation, there is frequently a large spread and overlapping of various attacks. In FIG. 3, the spread for L_inf-norm ($L_\infty$-norm) is depicted as the metric used. VGG16, ResNet50 Model and Inception V3 serve as network architectures.

VGG16, ResNet50 and InceptionV3 are known and widespread architectures of neural networks, which are mainly used in the area of image processing and especially for object identification and classification. The architectures are distinguished substantially in terms of the complexity of the combined processing steps, and in the branches within the networks, wherein, in a rather superficial assessment, VGG16 can be designated as the least complex structure and InceptionV3 as the most complex structure in terms of the underlying theoretical models.

The attacks evaluated in FIG. 3 comprise (from left to right, or in the key from top to bottom): L-BFGS Attack, Gradient Sign Attack, Saliency Map Attack, Deep Fool Attack, ADef Attack, Gradient Attack, Iterative Gradient Attack, Iterative Gradient Sign Attack, Local Search Attack and Contrast Resolution Attack. An attack (for an architecture), when measured with a metric, has a characteristic spread ("footprint").

By using multiple metrics, that is to say higher dimensional feature descriptors, classifiers can be trained in order to differentiate and to identify the individual attacks. It has been possible to show by means of dimension reduction that these high-dimensional spaces result in a better separation than two-dimensional spaces.

The accuracy of various standard classifiers in the case of a set of 12 attacks (consequently a rate probability of 8.33%) as well as various collections of metrics is summarized in Table 1:

TABLE 1

Accuracy of various standard classifiers in the case of a set of 12 attacks

| Classifier | Set of features 1 | | Set of features 2 | | Set of features 3 | |
|---|---|---|---|---|---|---|
| | Training accuracy | Test accuracy | Training accuracy | Test accuracy | Training accuracy | Test accuracy |
| Naive Bayes | 0.5602 | 0.5315 | 0.5948 | 0.5821 | 0.6269 | 0.6157 |
| LDA | 0.5202 | 0.5143 | 0.5504 | 0.5455 | 0.5766 | 0.5714 |
| SVM | 0.6705 | 0.6337 | 0.6805 | 0.6547 | 0.7286 | 0.7074 |
| MLP | 0.4120 | 0.3959 | 0.6183 | 0.6122 | 0.6741 | 0.6558 |

It can be clearly seen that good identification accuracy can already be achieved with these metrics with the selected classifiers. If the results are considered in more detail, the various individual attacks configure attack classes. If the identification accuracy is calculated based on the classes, rates of almost up to 100% are achieved.

Figure 4:
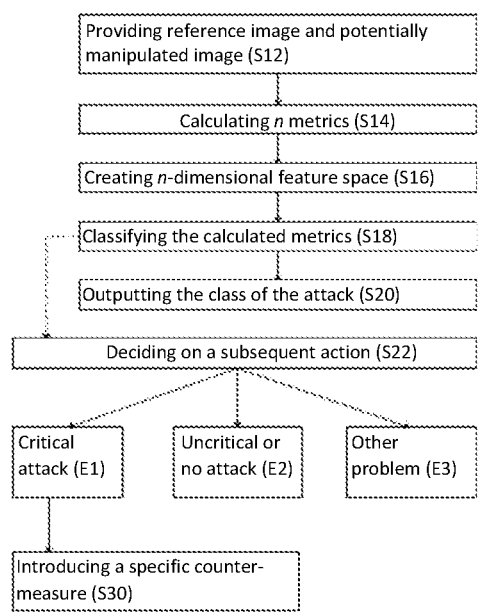
FIG. 4: schematically shows the process of a method for identifying adversarial attacks.

FIG. 4 schematically shows the process of a method for identifying adversarial attacks.

In step S12, an original image (reference image) and a potentially manipulated image are provided.

In step S14, a set of n metrics is calculated, which quantify differences between the original image and the potentially manipulated image in different ways. In this case, n is a natural number greater than one.

In step S16, a n-dimensional feature space is created based on the n calculated metrics. In other words, a feature vector is formed, which comprises the n calculated metrics.

The most relevant metrics can optionally be selected, which brings about a reduction in the dimension n. The most relevant metrics can be selected by a feature extraction or by a manual selection.

In step S18, the feature vector is classified. The classifier has been trained beforehand on the basis of training data which consist of different adversarial attack classes and corresponding metrics or feature vectors.

The feature extraction, feature reduction ("dimensionality reduction") and the classification can be summarized and preferably jointly learned in one step with the aid of deep learning and representation learning.

The identified attack class can be output in step S20.

An output can in particular be made to a decision-making system which makes decisions based on the identified attack class in a step S22. These include for example:
- D1) No attack detected or a non-critical attack detected: in this instance, the system continues working in normal mode;
- D2) Detection of another problem which can lead to pixel disturbances on the image, e.g., overexposure, masking, dirt;
- D3) Detection of a (critical) attack class and, consequently, of an attack: defense against the attack by a selected defense strategy based on the attack class, i.e., introduction of a specific counter-measure in a step S30.

The invention claimed is:

1. A method for identifying and classifying adversarial attacks on an automated detection system, comprising:
   providing a reference signal and a potentially manipulated signal, wherein each signal includes at least one of an image signal, a video signal, or an audio signal,
   calculating a set of n metrics which quantify differences between the reference signal and the potentially manipulated signal in different ways, with n being a natural number greater than one
   creating an n-dimensional feature space based on the calculated metrics,
   classifying the type of adversarial attack on the basis of the calculated metrics in the n-dimensional feature space, and
   outputting the class of the adversarial attack,
   wherein the automated detection system comprises at least one trained neural network, and the reference signal and the potentially manipulated signal are provided following completion of a training phase of the at least one neural network, and
   wherein subsets are created from the n metrics in order to extract most relevant m metrics, with m being a natural number less than n and, wherein the classification of the type of the adversarial attack is effected on the basis of the calculated metrics in the m-dimensional feature space.

2. The method according to claim 1, further comprising introducing a specific counter-measure against a class of adversarial attacks identified as critical.

3. The method according to claim 1, wherein the automated detection system comprises a camera-based sensor system of a vehicle, wherein the potentially manipulated signals are image or video signals which have been acquired by at least one camera of the camera-based sensor system.

4. The method according to claim 3, wherein the method for identifying an adversarial attack is performed during a signal data transfer from the vehicle to an online database.

5. The method according to claim 3, wherein the automated detection system comprises a multicamera system in a vehicle and wherein the potentially manipulated image or video signal and the reference image or video signal are overlapping or temporally offset acquisitions of the same scene by various individual cameras.

6. The method according to claim 3, wherein the metrics are calculated on the entire potentially manipulated image.

7. The method according to claim 3, wherein the metrics are calculated on an image detail of the potentially manipulated image.

8. The method according to claim 3, wherein the metrics are calculated from at least one of a series of images and a series of image details.

9. The method according to claim 3, wherein the n metrics contain multiple metrics which are selected from the group of:
   SSIM, L1-norm, L2-norm, KL divergence, MSE, MAE, PSNR, L∞-norm, L0-norm, Edge metrics, hash metrics, and Fourier transform metrics.

10. The method according to claim 1, wherein the creation of the subsets is implemented based on machine learning and wherein at least the most relevant m metrics are automatically learned with the aid of representation learning.

11. A system for identifying adversarial attacks on an automated detection system, comprising an input interface, an identification unit, and an output interface, wherein
   the input interface is configured to receive a reference signal and a potentially manipulated signal, wherein each signal includes at least one of an image signal, a video signal, or an audio signal, and to provide the potentially manipulated signal to the identification unit;
   wherein the identification unit comprises processor circuitry and is configured:
   to calculate a set of n metrics, which quantify differences between the reference signal and the potentially manipulated signal in different ways,
   to create a n-dimensional feature space based on the calculated metrics, and
   to classify the type of adversarial attack on the basis of the calculated metrics in the n-dimensional feature space, and
   the output interface is configured to output the class of the adversarial attack established by the identification unit
   wherein the automated detection system comprises at least one trained neural network such that the reference signal and the potentially manipulated signal are received by the system following completion of a training phase of the at least one neural network, and
   wherein subsets are created from the n metrics in order to extract most relevant m metrics, with m being a natural number less than n and, wherein the classification of the type of the adversarial attack is effected on the basis of the calculated metrics in the m-dimensional feature space.

12. The system according to claim 11, further comprising a second system which receives the class of the adversarial attack from the output interface, the second system introducing a specific counter-measure against if the class of adversarial attacks is identified as critical.

13. The system according to claim 11, wherein the automated detection system comprises a camera-based sensor system of a vehicle, wherein the potentially manipulated signals are image or video signals which have been acquired by at least one camera of the camera-based sensor system.

14. The system according to claim 13, wherein identifying an adversarial attack is performed during a signal data transfer from the vehicle to an online database.

15. The system according to claim 11, wherein the metrics are calculated on an image detail of the potentially manipulated image.

16. The system according to claim 11, wherein the creation of the subsets is implemented based on machine learning, and wherein the most relevant m metrics are automatically learned with representation learning.

17. The system according to claim 11, wherein the reference signal and the potentially manipulated signal are overlapping or temporally offset from each other of the same scene.

18. The method according to claim 5, wherein the reference signal and the potentially manipulated signal are temporally offset from each other of the same scene.

* * * * *